(12) United States Patent
Stringham

(10) Patent No.: US 7,401,255 B1
(45) Date of Patent: Jul. 15, 2008

(54) MECHANISMS FOR RECOVERING DATA FROM A BACKUP BY COMPARING TRANSFORMED DATA TO IDENTIFY ALTERED MEMORY BLOCKS

(75) Inventor: Russell R. Stringham, Orem, UT (US)

(73) Assignee: Symantec Corporation, Cupertino, CA (US)

( * ) Notice: Subject to any disclaimer, the term of this patent is extended or adjusted under 35 U.S.C. 154(b) by 602 days.

(21) Appl. No.: 11/082,162

(22) Filed: Mar. 16, 2005

(51) Int. Cl.
*G06F 11/00* (2006.01)
(52) U.S. Cl. .............. 714/13; 714/6; 714/15; 714/49; 714/52; 714/752; 711/216
(58) Field of Classification Search .......... 714/6, 714/13, 15, 49, 52, 752; 711/216
See application file for complete search history.

(56) References Cited

U.S. PATENT DOCUMENTS

2002/0073358 A1* 6/2002 Atkinson .................. 714/21
2005/0289381 A1* 12/2005 Yeo ........................... 714/1
2006/0106888 A1* 5/2006 Iida et al. ................ 707/203

* cited by examiner

*Primary Examiner*—Robert W Beausoliel, Jr.
*Assistant Examiner*—Charles Ehne
(74) *Attorney, Agent, or Firm*—Holland & Hart

(57) ABSTRACT

Mechanisms for efficiently restoring one or more memory blocks of a primary computing system. In order to restore a backup memory block, the primary system accesses transformed data that represents a result of a deterministic many-to-one mapping function, such as a hash function, applied to the backup memory block. The primary computing system also accesses transformed data that represents a result of the deterministic many-to-one mapping function applied to a corresponding primary memory block as the memory block exists on the primary system. The primary transformed data and the backup transformed data are then compared. If the primary and backup transformed data are different, the corresponding primary and backup memory blocks are also different. Accordingly, the primary computing system requests the full memory block from the backup computing system.

42 Claims, 5 Drawing Sheets

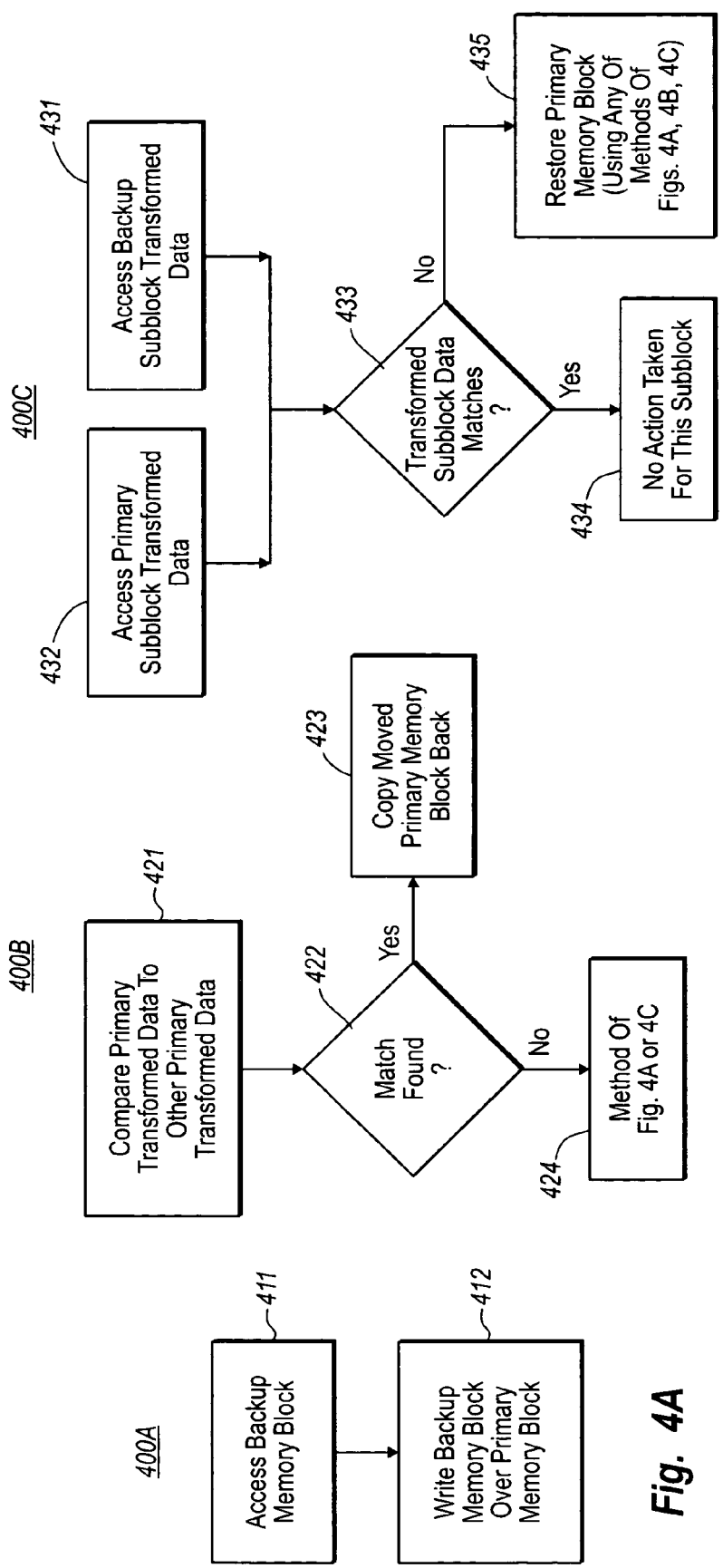

| | Primary | | Backup |
|---|---|---|---|
| 1 | A | | A |
| 2 | B | | B |
| 3 | J | | Unused |
| 4 | C | | C |
| 5 | H | | Unused |
| 6 | I | ← | D |
| 7 | E | | E |
| 8 | F | | F |
| 9 | Unused | ← | G |
| 10 | Unused | | Unused |
| 11 | Unused | | Unused |
| 12 | Unused | | Unused |
| 13 | Unused | ← | H |
| 14 | Unused | ← | I |
| 15 | G | | Unused |
| 16 | K | | Unused |

*Fig. 5A*

| | Primary | | Backup |
|---|---|---|---|
| 1 | A | | A |
| 2 | B | | B |
| 3 | J | | Unused |
| 4 | C | | C |
| 5 | H | | Unused |
| 6 | I | ← | D |
| 7 | E | | E |
| 8 | F | | F |
| 9 | Unused | | G |
| 10 | Unused | | Unused |
| 11 | Unused | | Unused |
| 12 | Unused | | Unused |
| 13 | Unused | | H |
| 14 | Unused | | I |
| 15 | G | | Unused |
| 16 | K | | Unused |

*Fig. 5B*

MECHANISMS FOR RECOVERING DATA FROM A BACKUP BY COMPARING TRANSFORMED DATA TO IDENTIFY ALTERED MEMORY BLOCKS

BACKGROUND OF THE INVENTION

1. The Field of the Invention

The present invention relates to computing technology; and more specifically, to mechanisms for efficiently recovering data from a backup computing system to a primary computing system.

2. Background and Related Art

Computing technology has transformed the way we work and play. Business, residences, and other enterprises have come to rely on computing systems to manage their key operational data. Often, the data itself is many times more valuable to an enterprise that the computing hardware that stores and manages the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system.

At some point, the data at the primary computing system may become inaccessible or otherwise lost. For example, the data may become corrupted due to a system failure or viral infiltration. Software (such as the operating system, application, or drivers) needed to access the data may also be corrupted. Furthermore, hardware needed to access the data may become damaged. For instance, the disk drive or computing system may become damaged by a wide variety or realistic scenarios. The computing system may be dropped in the case of a portable system, or may even be intentionally harmed by a user or passerby. A wide variety of possible natural disasters may also harm the primary computing system. Whatever causes the failure, recovery occurs by restoring or replacing any needed hardware for the primary computing system, and then copying disk sectors from the backup computing system back to the primary computing system.

When recovering data access after such a failure, time is money. Depending on the enterprise size and operation, each minute without operational data may mean thousands, or even millions, of dollars in lost revenue. Accordingly, what would be advantageous are mechanisms for quickly recovering data access to a primary computing system.

BRIEF SUMMARY OF THE INVENTION

The foregoing problems with the prior state of the art are overcome by the principles of the present invention, which are directed towards mechanisms for efficiently restoring data of a primary computing system. In accordance with one aspect of the invention, the primary computing system accesses backup block transformed data that represents a result of a deterministic many-to-one mapping function applied to a backup memory block as the memory block exists on a backup computing system. The block may be of any size and may be volatile or non-volatile memory. One of many possible deterministic many-to-one mapping functions is a hash function, although this is not required.

The primary computing system also accesses primary block transformed data that represents a result of the deterministic many-to-one mapping function applied to a corresponding primary memory block as the memory block exists on the primary computing system. The corresponding primary memory block is at the same relative memory location (or locations in the case of a discontiguous memory block) on the primary computing system as the backup memory block on the backup computing system. The transformed result of the memory block may be much smaller than the memory block itself.

If the primary computing system determines that the backup block transformed data does not match the primary block transformed data, then the primary computing system restores the primary memory block by, for example, obtaining the entire backup memory block from the backup computing system. If, on the other hand, the primary computing system determines that the backup block transformed data does match the primary block transformed data, then the primary computing system may use this information to determine that the memory block does not need to be restored.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates a flowchart of one method for restoring a primary memory block;

FIG. 4B illustrates a flowchart of another method for restoring a primary memory block;

FIG. 4C illustrates a flowchart of yet another method for restoring a primary memory block;

FIG. 5A shows a schematic data flow showing an example data restoration in accordance with one embodiment of the present invention; and FIG. 5B shows a schematic data flow showing an example data restoration in accordance with a second embodiment of the present invention.

DETAILED DESCRIPTION OF THE PREFERRED EMBODIMENTS

The principles of the present invention relate to mechanisms for efficiently restoring one or more memory blocks of a primary computing system. In order to restore a backup memory block from a backup computing system to a primary computing system, the primary computing system accesses transformed data that represents a result of a deterministic many-to-one mapping function applied to the backup memory block. The primary computing system also accesses transformed data that represents a result of the deterministic many-to-one mapping function applied to a corresponding primary memory block as the memory block exists on the primary computing system.

The primary transformed data and the backup transformed data are then compared. If the primary and backup transformed data are different, the corresponding primary and backup memory blocks are also different. Accordingly, the primary computing system requests the full memory block from the backup computing system. If the primary and transformed data are the same, the primary and backup memory blocks are likely the same with high probability, and thus the backup memory block is not requested. The process may be repeated for multiple memory blocks.

First, a general computing system will be described with respect to FIG. 1, as being a suitable computing system that may be used to practice the principles of the present invention. Then, the primary and backup environment in which the invention may be practiced will be described with respect to FIG. 2. Finally, the specific recovery embodiments of the present invention will be described with respect to FIGS. 3, 4A, 4B, 4C, 5A and 5B.

Figure 1:
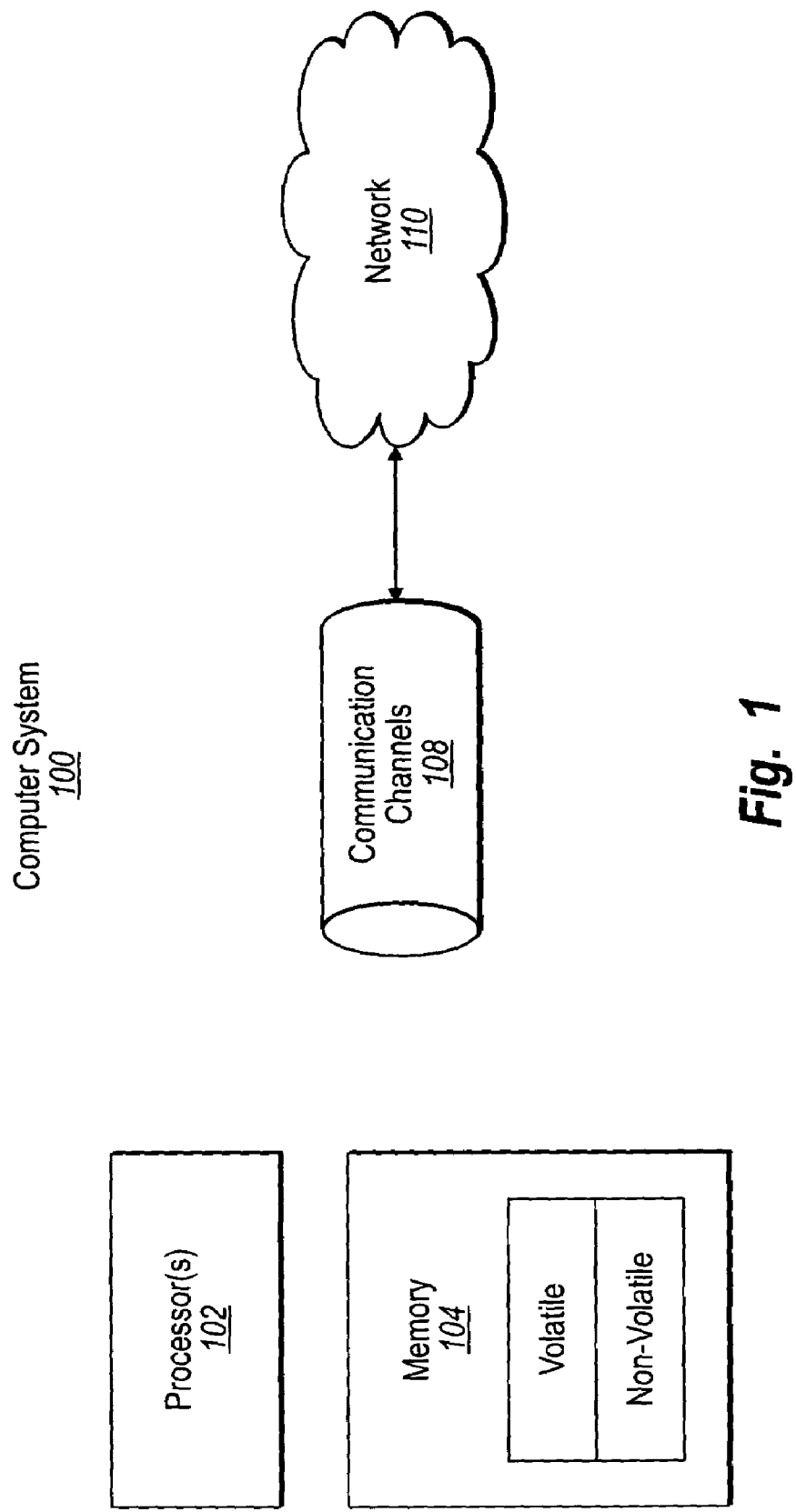
FIG. 1 illustrates a computing environment in which a primary computing system may communicate with a backup computing system for purposes of restoring a backup copy of data on the backup computing system to the primary computing system.

FIG. 1 shows a schematic diagram of an example computing system that may be used to implement features of the present invention. The described computing system is only one example of such a suitable computing system and is not intended to suggest any limitation as to the scope of use or functionality of the invention. Neither should the invention be interpreted as having any dependency or requirement relating to anyone or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory include Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
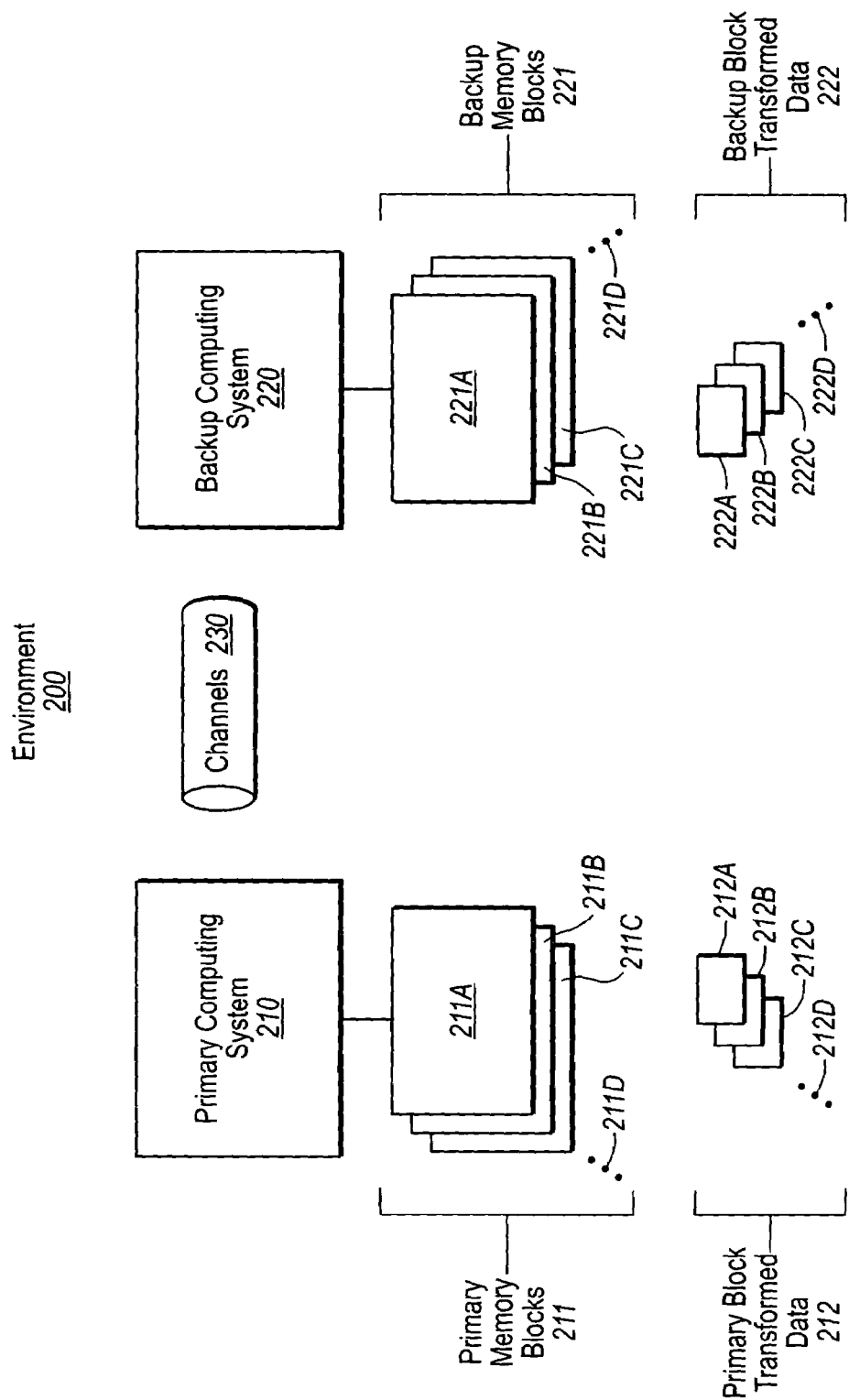
FIG. 2 illustrates a network environment in which a backup computing system maintains a backup version of active data of the primary computing system, as that active data existed at a previous instant in time.

FIG. 2 illustrates a network environment 200 that includes a primary computing system 210 and a backup computing system 220. The primary computing system 210 is termed "primary" because it maintains the active data that is to be protected. The backup computing system 220 is termed "backup" because it maintains a backup copy of the active data as the active data existed at a previous point in time. The primary computing system 210 and the backup computing system 220 may each be structured as described above for the computing system 100 of FIG. 1. However, this is not required by any means. The primary computing system 210 and the backup computing system 220 may be any computing system of any form.

The primary computing system 210 typically has access to multiple memory blocks 211A, 211B, 211C amongst potentially many others as represented by the ellipses 211D (referred to collectively as "primary memory blocks 211"). As used herein the term, "memory block" refers to any portion of memory, whether volatile memory, or non-volatile memory or storage. For instance, in the case of magnetic or optical disk storage, memory blocks may be measured in terms of "sectors". A sector is an addressable portion of disk space that is often 512 bytes in size for magnetic disk drives. When referring to magnetic disk drives, a "cluster" is almost always an integer multiple of the sector size, such as 1024 bytes or 4096 bytes as directed by the operating system.

When working with disk storage, it is often convenient to work with entire sectors or clusters of storage at a time. However, even when operating on disk storage, the principles of the present invention may also operate with primary or backup "memory blocks" that are not sized as integer multiples of sectors and/or clusters. Furthermore, although there are efficiencies in working with multiple memory blocks of the same size, the principles of the present invention are not limited to working with memory blocks that are of the same size. The memory blocks may be, for example, files, which often have variable sizes as permitted by the file system. The memory block may even include several discontiguous portions of physical memory space, such that data that is not part of the memory block is interspersed between data that is part of the memory block.

The backup computing system 220 is illustrated as having access to a number of memory blocks 221A, 221B, 221C amongst potentially many others as represented by the ellipses 221D. Such backup memory blocks may be referred to collectively herein as "backup memory blocks 221".

As the primary computing system 210 normally operates, the "data" within any given primary memory block may change over time. At certain times referred to herein as "backup times", the primary computing system 210 provides an image or "picture" of at least some of the primary memory blocks as those blocks existed at the corresponding backup time, and then provides the memory blocks to the backup computing system 220. The primary computing system 210 may communicate with the backup computing system 220 over channel 230. The channel 230 may be, for example, a network.

At some point, the primary computing system 210 may experience a failure that results in an inability to access consistent data. For example, this failure may be due to corruption of the underlying data itself. Such data corruption may be the result of inappropriate action by software running on the primary computing system 210, failure of the writing mechanism that writes the data, failure of the storage mechanism to be able to store the data, or perhaps environmental circumstances that arbitrarily change the data. Even if the data is not corrupt, the ability to access that data may be lost due to some hardware failure. In the case of data access failure on the primary computing system 210, the backup computing system 220 may assist in recovery by providing at appropriate times backup memory blocks to the primary computing system 210. The faster such recovery, the less harm caused by the data access failure condition. The principles of the present invention works best if at least some of the data on the primary system is still readable.

In order to facilitate fast recovery, the primary computing system 210 and the backup computing system 220 each maintain transformed representations of the memory blocks. For instance, primary computing system 210 not only maintains primary memory blocks 211, but also maintains transformation results of those primary memory blocks in the form of primary block transformed data 212. For instance, the primary block transformed data 212A, 212B and 212C represent transformation results corresponding to primary memory blocks 211A, 211B and 211C, respectively. The ellipses 212D represent other primary block transformed data that represent transformation results of the other memory blocks represented by the ellipses 211D. Likewise, the backup computing system 220 maintains transformation results of the backup memory blocks 221 in the form of backup block transformed data 222. For instance, the backup block transformed data 222A, 222B and 222C represent transformation results corresponding to backup memory blocks 221A, 221B and 221C, respectively. The ellipses 222D represent other backup block transformed data that represent transformation results of the other backup memory blocks represented by the ellipses 221D. Rather than maintaining the transformation results for each block, the primary and/or secondary system might only compute them when needed and discard them when no longer needed.

The transformation functions used to generate the primary block transformed data 212 and the backup block transformed data 222 is a deterministic many-to-one mapping function. The mapping functions need not be identical for the primary and backup computing systems, but they are the same to the extent that if the primary memory block and the backup memory block are the same, the transformation functions result in the same transformed data. On the other hand, if the primary memory block and the backup memory block are different, the transformation function most likely will result in different transformed data. In one embodiment, the many-to-one mapping function is a hash function that may be cryptographically secure such that if the primary block transformed data and the backup block transformed data are the same, then there is a near certainty to within acceptable risk tolerances that the associated primary memory block and backup memory block are the same. The level of risk tolerance for a false match may differ according to the application and nature of the data.

Deterministic many-to-one mapping functions are not limited to hash functions. A deterministic many-to-one mapping function is any function that results in the same output value for multiple input values. Other examples of such mapping functions include truncating the input bits to generate the output bits, sampling the input bits and providing the sampled bits in a certain order as output bits, and so forth.

Figure 3:
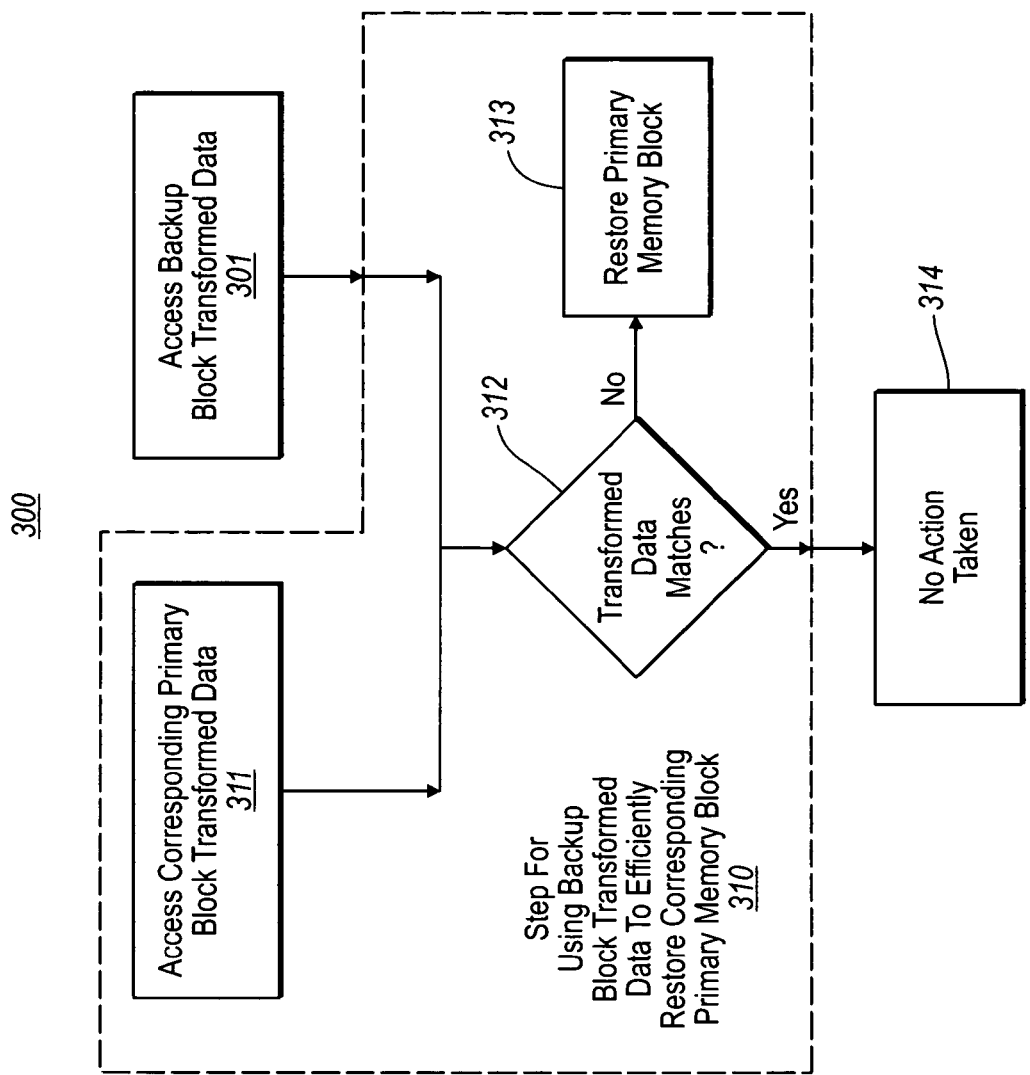
FIG. 3 illustrates a flowchart of a method for restoring backup data from a backup computing system to a primary computing system in accordance with the principles of the present invention.

FIG. 3 illustrates a flowchart of a method 300 for a primary computing system to restore at least a portion of storage at the primary computing system in accordance with the principles of the present invention. The primary computing system accesses backup block transformed data that represents a result of a deterministic many-to-one mapping function applied to a backup memory block as the memory block exists on the backup computing system (act 301). For instance, the primary computing system 210 may access the backup block transformed data 222A from the backup computing system 220 over the channel 230.

The primary computing system then performs a result-oriented step for using the backup block transformed data to efficiently restore a primary memory block corresponding to the backup memory block if appropriate (step 310). This function, result-oriented step may include any corresponding acts that may accomplish the stated result. However, in the illustrated embodiment, the step includes corresponding acts 311, 312 and 313.

Specifically, the primary computing system accesses primary block transformed data that represents a result of the deterministic many-to-one mapping function applied to a corresponding primary memory block as it exists on the primary computing system (act 311). For instance, the primary computing system 210 may access the backup block transformed data 212A.

As previously mentioned, the accessed primary block transformed data is a result of the transformation on a primary memory block. Furthermore, the backup block transformed data is a result of the transformation on a "corresponding" backup memory block. In this context, the "corresponding" primary memory block is at the same "relative memory location" on the primary computing system as the backup memory block on the backup computing system. The same "relative memory locations" means that the address locations may have some fixed offset, or there may be some other mapping of a specific primary memory address to a backup memory address. This address location may be a physical address location, or may be an address that is abstracted from the physical address using some address abstraction component (such as a virtual memory manager). For a discontiguous memory block "the same relative memory location" means the same relative memory location for each contiguous section of the discontiguous memory block.

Once the primary block transformed data is accessed (act 311), and the backup block transformed data is accessed (act 301), the primary computing system determines whether the backup block transformed data matches the primary block transformed data (decision block 312). If the primary and backup block transformed data do not match (No in decision block 312), then the primary computing system restores the primary memory block (act 313) since the determination that the backup block transformed data does not match the primary block transformed data also means that the corresponding primary and backup memory blocks are different. On the other hand, if the primary and backup transformed data do match (Yes in decision block 312), no further action is taken to restore the primary memory block (act 314) since the match is indicative of a high probability that the primary and backup memory blocks are the same. Note that some embodiments of the present invention might have the backup computing system perform the comparison of the transformed data, and restore the backup data to the primary if the transformed data values do not match.

FIGS. 4A through 4C illustrate several example methods for restoring the primary memory block based on the determination that the primary and backup block transformed data does not match.

Specifically, FIG. 4A illustrates a method 400A for restoring the primary memory block in which the primary computing system accesses the actual backup memory block corresponding to the transformed data from the backup computing system (act 411). Then, the primary computing system writes the backup memory block over the corresponding primary memory block (act 412) to complete the restoration of the primary memory block. Writing the backup memory block "over the" corresponding primary memory block could mean that the primary memory block is deleted prior to writing the backup memory block. However, for efficiency reasons, the backup memory block may be literally written over the primary memory block.

FIG. 4B represents another method 400B of restoring the primary memory block based on a determination that the primary and backup block transformed data do not match. In this method 400B, the backup memory block is not automatically obtained. Rather, the primary computing system first compares the primary transformed data to other primary block transformed data corresponding to other primary memory blocks on the primary computing system (act 421). These other primary block transformed data are also generated by applying the deterministic many-to-one mapping function on the corresponding primary memory block.

The primary computing system then determines whether or not the primary block transformed data for the primary memory block to be recovered matches the primary block transformed data for any other the other primary memory blocks (decision block 422). If a match is found (Yes in decision block 422), then the match likely means that the content of the primary memory block has likely just been moved from one location to another. In that case, the moved content is copied back into the primary memory block (act 423). If a match is not found (No in decision block 422), then the method of FIG. 4A or 4C may be performed. Specifically, for the method 400A of FIG. 4A, the corresponding backup memory block would be obtained from backup computing system, and written over the primary memory block. The case of FIG. 4C will now be described.

The method 400C of FIG. 4C illustrates another mechanism whereby the primary memory block may be restored. The method 400C may be performed to replace act 313 entirely, or may be performed to replace act 424 of FIG. 4B. Specifically, if the primary and backup block transformed data do not match (No in decision block 312), and potentially also if the primary block transformed data does not match other primary block transformed data (No in decision block 422), the method 400C may be performed for each of multiple consistent subblocks for the memory block that has changed.

Specifically, the primary computing system accesses backup subblock transformed data that represents a result of another deterministic many-to-one mapping function applied to a constituent backup memory subblock of the backup memory block (act 431). This deterministic mapping function may be the same function used to obtain the transformed data for the parent block, although that need not be the case. Also, the primary computing system accesses primary subblock transformed data that represents a result of the deterministic many-to-one mapping function applied to the corresponding constituent primary memory subblock of the primary memory block (act 432).

The primary computing system may then determine whether or not the backup subblock transformed data matches the primary subblock transformed data (decision block 433). If the primary and backup subblock transformed data does match (Yes in decision block 433), then no action is taken (act 434) to restore that subblock since the subblocks are likely already up-to-date. On the other hand, if the primary and backup subblock transformed data do not match (No in decision block 433), then the subblock is restored (act 435). This restoration of the subblock may occur by performing any of the methods 400A, 400B or 400C with respect to that specific subblock. The method of FIG. 4C may even be recursively applied through multiple levels of subblocks.

In order to clarify FIG. 3 and the method of FIG. 4A, an example restoration is provided with reference to FIG. 5A, which shows example restoration message flows between a backup and primary computing system. Specifically, 16 memory blocks are shown for each of the primary and backup computing systems, wherein any given backup memory block at a particular vertical location corresponds to a primary memory block at the same vertical location. The vertical location and the corresponding block are also labeled as corresponding to vertical positions 1 through 16. Unused memory blocks are marked as "Unused". Letters of the English alphabet "A" through "L" are used to symbolize the content of each memory block, wherein if two memory blocks are symbolized with different letters, their content is different, and wherein if two memory blocks are symbolized with the same letter, their content is the same. For clarity and to demonstrate the efficiency of the principles of the present invention, only the transfer of full memory blocks are shown. Transfer of the much smaller transformed data is not shown, but is described.

In the method 300 of FIG. 3 in combination with the method 400A of FIG. 4A, the backup computing system computes a digest (i.e., a transformed representation of the corresponding data block) for all used blocks. In this case, the following digests are calculated:

the digest of "A" corresponding to vertical position 1,
the digest of "B" corresponding to vertical position 2,
the digest of "C" corresponding to vertical position 4,
the digest of "D" corresponding to vertical position 6,
the digest of "E" corresponding to vertical position 7, the digest of "F" corresponding to vertical position 8, the digest of "G" corresponding to vertical position 9, the digest of "H" corresponding to vertical position 13, and the digest of "I" corresponding to vertical position 14.

These digests may be computed well in advance of the recovery operations. These digests and their corresponding position are sent to the primary computing system. The primary computing system also computes digests for each of the blocks on the primary computing system. At the very least, the primary computing system calculates the digests corresponding to the vertical positions of the digests sent by the backup computing system. This may also be done well in advance of the recovery operation.

The primary computing system then compares the corresponding primary and backup digests for each of the vertical positions for the backup digests provided by the backup computing system (i.e., for each of vertical positions 1, 2, 4, 6, 7, 8, 9, 13 and 14). By this comparison, the primary computing system determines that the primary memory blocks corresponding to positions 6, 9, 13 and 14 are different than the corresponding backup memory blocks. Accordingly, the primary computing system requests memory blocks D, G, H and I corresponding to these positions from the backup computing system machine, and writes these recovered memory blocks at their respective locations.

FIG. 5A may also be used to explain an example of the method 400C of FIG. 4C in conjunction with the method 300 of FIG. 3. Specifically, for this example, assume that there are two tiers of blocks. The larger blocks consist of three of the memory blocks illustrated in FIG. 5A. The backup machine computes a digest for the large block. Large block ABC (corresponding to positions 1, 2 and 4), a digest for large block DEF (corresponding to positions 6-8), and a digest for large block GHI (corresponding to positions 9, 13 and 14). The backup computing system then sends these three digests to the primary computing system, along with the positions of each. Note that in this case block ABC and block GHI are discontiguous blocks.

The primary computing system then computes the large block digests for the corresponding vertical positions, and compares the resulting digests. The primary computing system discovers that the primary and backup digests for large block ABC match. However, the two digests corresponding to backup large blocks DEF and GHI do not match. Accordingly, the primary computing system then requests the backup subblock digests for the blocks corresponding to the vertical positions 6-9, 13 and 14 (corresponding to large backup blocks DEF and GHI), which the backup computing system computes and transmits. Alternatively, the transmission of these smaller digests could be performed at the same time the digests for the larger blocks are transmitted, although this may use more network bandwidth.

The primary computing system also computes the digests corresponding to the smaller blocks at vertical positions 6-9, 13 and 14. Note that on a real machine, it is expected that more large blocks would behave like large block ABC where the full block matches, so that the actual amount of data sent across the network might be far less than the method 400A of FIG. 4A. The primary computing system would use the subblock digests to discover that the blocks corresponding to positions 6, 9, 13 and 14 do not match. The primary computing system would then request and restore the corresponding subblocks D, G, H and I.

An example of the method 400B is shown with respect to FIG. 5B. FIG. 5B is similar to FIG. 5A, except for there is only one memory block that is actually transmitted from the backup computing system to the primary computing system, rather than four in FIG. 5A.

In this case, the memory blocks will be with large memory blocks ABC, DEF, and GHI. The backup computing system computes digests for large backup blocks ABC, DEF and GHI and sends the large block digests to the primary computing system, along with the positions of each if not implied. The primary machine computes the corresponding large block digests and finds that large block ABC matches, but requests small block digests for D-I (six additional digests), which the backup computing system computes and sends to the primary computing system. The primary computing system also computes digests for the small blocks at each of these positions. It finds that blocks E and F match. Up to this point, this is exactly the same as the large block method described with respect to FIG. 5A.

Continuing further, however, instead of requesting the small blocks D, G, H and I from the backup computing system, the primary computing system compares the digests for each of these small blocks to other digests corresponding to other primary blocks. In this process, the primary computing system discovers that blocks G, H and I have been relocated. Accordingly, the blocks at vertical locations 9, 12 and 13 are restored by copying the relocated memory blocks back to their original locations. Block D, which was not discovered by this process either, is the only memory block that is actually requested by the primary computing system, and transmitted by the backup computing system.

These methods significantly reduce the amount of information that is sent from the backup computing system to the primary computing system during a recovery process. Accordingly, the time required to recover is shortened as compared to a simple recovery process in which all of the backup data is transmitted back to each primary computing system. This is particularly true if the primary and backup computing systems are located over a network of limited bandwidth, and in which there may be multiple primary computing systems engaging in such recovery operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for a primary computing system to restore at least a portion of storage at the primary computing system from a backup memory block on a backup computing system, the method comprising:

an act of accessing backup block transformed data that represents a result of a deterministic many-to-one mapping function applied to the backup memory block as the memory block exists on the backup computing system;

an act of accessing primary block transformed data that represents a result of the deterministic many-to-one mapping function applied to a corresponding primary memory block as it exists on the primary computing system, the corresponding primary memory block being at the same relative memory location on the primary computing system as the backup memory block on the backup computing system;

an act of determining that the backup block transformed data does not match the primary block transformed data; and an act of restoring the primary memory block based on the determination that the backup block transformed data does not match the primary block transformed data.

2. A method in accordance with claim 1, wherein the deterministic many-to-one mapping function is a hash function.

3. A method in accordance with claim 1, wherein the act of restoring the primary memory block based on the determination that the backup block transformed data does not match the primary block transformed data comprises:

an act of accessing the backup memory block from the backup computing system; and an act of writing the backup memory block over the primary memory block.

4. A method in accordance with claim 1, wherein the primary block transformed data is first primary block transformed data, wherein the act of restoring the primary memory block based on the determination that the backup block transformed data does not match the primary block transformed data comprises:

an act of comparing the first primary block transformed data to other primary block transformed data corresponding to a plurality of other primary memory blocks on the primary computing system, wherein each of the other primary block transformed data is also generated by applying the deterministic many-to-one mapping function to the corresponding other primary memory block;

an act of determining that the first primary block transformed data match one of the other primary block transformed data; and an act of copying the primary memory block corresponding to the other primary block transformed data into the primary memory block.

5. A method in accordance with claim 1, wherein the primary block transformed data is first primary block transformed data, wherein the act of restoring the primary memory block based on the determination that the backup block transformed data does not match the primary block transformed data comprises:

an act of comparing the first primary block transformed data to other primary block transformed data corresponding to a plurality of other primary memory blocks on the primary computing system, wherein each of the other primary block transformed data is also generated by applying the deterministic many-to-one mapping function to the corresponding other primary memory block;

an act of determining that the first primary block transformed data does not match any of the other primary block transformed data;

in response to the act of determining that the first primary block transformed data does not match any of the other primary block transformed data, and act of accessing the backup memory block from the backup computing system; and an act of writing the backup memory block over the primary memory block.

6. A method in accordance with claim 1, wherein the primary block transformed data is first primary block transformed data and the deterministic many-to-one mapping function is a first many-to-one mapping function, wherein the act of restoring the primary memory block based on the determination that the backup block transformed data does not match the primary block transformed data comprises:

an act of comparing the first primary block transformed data to other primary block transformed data corresponding to a plurality of other primary memory blocks on the primary computing system, wherein each of the other primary block transformed data is also generated by applying the first deterministic many-to-one mapping function to the corresponding other primary memory block;

an act of determining that the first primary block transformed data does not match any of the other primary block transformed data;

in response to the act of determining that the first primary block transformed data does not match any of the other primary block transformed data, an act of accessing backup subblock transformed data that represents a result of a second deterministic many-to-one mapping function applied to a constituent backup memory subblock of the backup memory block;

an act of accessing primary block transformed data that represents a result of the second deterministic many-to-one mapping function applied to a constituent primary memory subblock of the primary memory block;

an act of determining that the backup subblock transformed data does not match the primary subblock transformed data; and an act of restoring the constituent primary memory subblock based on the determination that the backup subblock transformed data does not match the primary subblock transformed data.

7. A method in accordance with claim 1, wherein the primary memory block is a sector of storage.

8. A method in accordance with claim 1, wherein the primary memory block is a cluster of sectors of storage.

9. A method in accordance with claim 1, wherein the deterministic many-to-one mapping function is a first deterministic many-to-one mapping function, wherein the act of restoring the primary memory block based on the determination that the backup block transformed data does not match the primary block transformed data comprises:

an act of accessing backup subblock transformed data that represents a result of a second deterministic many-to-one mapping function applied to a constituent backup memory subblock of the backup memory block;

an act of accessing primary subblock transformed data that represents a result of the second deterministic many-to-one mapping function applied to a constituent primary memory subblock of the primary memory block;

an act of determining that the backup subblock transformed data does not match the primary subblock transformed data; and an act of restoring the constituent primary memory subblock based on the determination that the backup subblock transformed data does not match the primary subblock transformed data.

10. A method in accordance with claim 9, wherein the act of restoring the constituent primary memory block based on the determination that the backup subblock transformed data does not match the primary subblock transformed data comprises:

an act of accessing backup sub-subblock transformed data that represents a result of a third deterministic many-to-one mapping function applied to a constituent backup memory sub-subblock of the backup memory subblock;

an act of accessing primary sub-subblock transformed data that represents a result of the third deterministic manyto-one mapping function applied to a constituent primary memory sub-subblock of the primary memory subblock;

an act of determining that the backup sub-subblock transformed data does not match the primary sub-subblock transformed data; and an act of restoring the constituent primary memory sub-subblock based on the determination that the backup sub-subblock transformed data does not match the primary sub-subblock transformed data.

11. A method in accordance with claim 9, wherein the first deterministic many-to-one mapping function is the same as the second deterministic many-to-one mapping function.

12. A method in accordance with claim 9, wherein the act of restoring the constituent primary memory subblock based on the determination that the backup subblock transformed data does not match the primary subblock transformed data comprises:

an act of accessing the constituent backup memory subblock from the backup computing system; and an act of writing the constituent backup memory subblock over the constituent primary memory subblock.

13. A method in accordance with claim 9, wherein the primary subblock transformed data is first primary subblock transformed data, wherein the act of restoring the constituent primary memory subblock comprises:

an act of comparing the first primary subblock transformed data to other primary subblock transformed data corresponding to a plurality of other primary memory subblocks on the primary computing system, wherein each of the other primary subblock transformed data is also generated by applying the second deterministic many-to-one mapping function to the corresponding other primary memory subblock;

if the other primary subblock transformed data matches the first primary subblock transformed data, an act of copying the corresponding other primary memory subblock over the constituent primary memory subblock; and if the other primary subblock transformed data does not match the first primary subblock transformed data, an act of accessing the constituent backup memory subblock from the backup computing system, and an act of writing the constituent backup memory subblock over the constituent primary computing system.

14. A method in accordance with claim 1, wherein the restored primary memory block includes computer-executable instructions or configuration information for either an operating system or an application of the primary computing system.

15. A computer program product comprising one or more computer-readable storage media having thereon computer-executable instructions that, when executed by one or more processors or a primary computing system, cause the primary computing system to perform a method for restoring at least a portion of storage at the primary computing system from a backup memory block on a backup computing system, the method comprising:

an act of accessing backup block transformed data that represents a result of a deterministic many-to-one mapping function applied to the backup memory block as the memory block exists on the backup computing system;

an act of accessing primary block transformed data that represents a result of the deterministic many-to-one mapping function applied to a corresponding primary memory block as it exists on the primary computing system, the corresponding primary memory block being at the same relative memory location on the primary computing system as the backup memory block on the backup computing system;

an act of determining that the backup block transformed data does not match the primary block transformed data; and an act of restoring the primary memory block based on the determination that the backup block transformed data does not match the primary block transformed data.

16. A computer program product in accordance with claim 15, wherein the act of restoring the primary memory block based on the determination that the backup block transformed data does not match the primary block transformed data comprises:

an act of accessing the backup memory block from the backup computing system; and an act of writing the backup memory block over the primary memory block.

17. A computer program product in accordance with claim 15, wherein the primary block transformed data is first primary block transformed data, wherein the act of restoring the primary memory block based on the determination that the backup block transformed data does not match the primary block transformed data comprises:

an act of comparing the first primary transformed data to other primary block transformed data corresponding to a plurality of other primary memory blocks on the primary computing system, wherein each of the other primary block transformed data is also generated by applying the deterministic many-to-one mapping function to the corresponding other primary memory block;

an act of determining that the first primary block transformed data matches one of the other primary block transformed data; and an act of copying the primary memory block corresponding to the other primary block transformed data into the primary memory block.

18. A computer program product in accordance with claim 15, wherein the primary block transformed data is first primary block transformed data, wherein the act of restoring the primary memory block based on the determination that the backup block transformed data does not match the primary block transformed data comprises:

an act of comparing the first primary block transformed data to other primary block transformed data corresponding to a plurality of other primary memory blocks on the primary computing system, wherein each of the other primary block transformed data is also generated by applying the deterministic many-to-one mapping function to the corresponding other primary memory block;

an act of determining that the first primary block transformed data does not match any of the other primary block transformed data;

in response to the act of determining that the first primary block transformed data does not match any of the other primary block transformed data, and act of accessing the backup memory block from the backup computing system; and an act of writing the backup memory block over the primary memory block.

19. A computer program product in accordance with claim 15, wherein the deterministic many-to-one mapping function is a first deterministic many-to-one mapping function, wherein the act of restoring the primary memory block based on the determination that the backup block transformed data does not match the primary block transformed data comprises:

an act of accessing backup subblock transformed data that represents a result of a second deterministic many-to-one mapping function applied to a constituent backup memory subblock of the backup memory block;

an act of accessing primary subblock transformed data that represents a result of the second deterministic many-to-one mapping function applied to a constituent primary memory subblock of the primary memory block;

an act of determining that the backup subblock transformed data does not match the primary subblock transformed data; and an act of restoring the constituent primary memory subblock based on the determination that the backup subblock transformed data does not match the primary subblock transformed data.

20. A computer program product in accordance with claim 19, wherein the act of restoring the constituent primary memory subblock based on the determination that the backup subblock transformed data does not match the primary subblock transformed data comprises:

an act of accessing the constituent backup memory subblock from the backup computing system; and an act of writing the constituent backup memory subblock over the constituent primary memory subblock.

21. A computer program product in accordance with claim 19, wherein the primary subblock transformed data is first primary subblock transformed data, wherein the act of restoring the constituent primary memory subblock comprises:

an act of comparing the first primary subblock transformed data to other primary subblock transformed data corresponding to a plurality of other primary memory subblocks on the primary computing system, wherein each of the other primary subblock transformed data is also generated by applying the second deterministic many-to-one mapping function to the corresponding other primary memory subblock;

if the other primary subblock transformed data matches the first primary subblock transformed data, an act of copying the corresponding other primary memory subblock over the constituent primary memory subblock; and if the other primary subblock transformed data does not match the first primary subblock transformed data, an act of accessing the constituent backup memory subblock from the backup computing system, and an act of writing the constituent backup memory subblock over the constituent primary computing system.

22. A method for a primary computing system to restore at least a portion of storage at the primary computing system from a backup memory block on a backup computing system, the method comprising:

an act of accessing backup block transformed data that represents a result of deterministic many-to-one mapping function applied to the backup memory block as the memory block exists on the backup computing system; and a step for using the backup block transformed data to efficiently restore a primary memory block corresponding to the backup memory block.

23. A method for a primary computing system to restore at least a portion of storage at the primary computing system from a backup memory block on a backup computing system, the method comprising:

applying a deterministic many-to-one mapping function to a primary memory block to create primary block transformed data;

applying a deterministic many-to-one mapping function to the backup memory block to create backup block transformed data, the primary memory block being at a same relative memory location on a primary computing system as the backup memory block on the backup computing system, wherein:

the backup block transformed data and the primary block transformed data are the same if the backup memory block and the primary memory block are the same;

the backup block transformed data and the primary block transformed data are different if the backup memory block and the primary memory block are different.

24. The method of claim 23, wherein the backup memory block and the primary memory block each have the same fixed offset.

25. The method of claim 23, wherein an address of the primary memory block may be mapped to an address of the backup memory address.

26. The method of claim 25, wherein the address of the primary memory block is at least one of: a physical address location or an address abstraction component.

27. The method of claim 23, wherein the primary memory block comprises a discontiguous memory block.

28. The method of claim 27, wherein and the backup memory block has the same relative memory location for each contiguous section of the discontiguous memory block.

29. The method of claim 23, wherein the deterministic many-to-one mapping function is a hash function.

30. The method of claim 23, further comprising:

applying a deterministic many-to-one mapping function to a plurality of primary memory blocks.

31. A method in accordance with claim 23, wherein the primary memory block is a sector of storage.

32. A method in accordance with claim 23, wherein the primary memory block is a cluster of sectors of storage.

33. A computer-readable storage medium having thereon computer-executable instructions that, when executed by one or more processors or a primary computing system, cause the primary computing system to perform a method for restoring at least a portion of storage at the primary computing system from a backup memory block on a backup computing system, comprising:

a first computer-executable instruction operable to apply a deterministic many-to-one mapping function to a primary memory block to create primary block transformed data;

a second computer-executable instruction operable to apply a deterministic many-to-one mapping function to the backup memory block to create backup block transformed data, the primary memory block being at a same relative memory location on a primary computing system as the backup memory block on the backup computing system, wherein:

the backup block transformed data and the primary block transformed data are the same if the backup memory block and the primary memory block are the same;

the backup block transformed data and the primary block transformed data are different if the backup memory block and the primary memory block are different.

34. The computer-readable storage medium of claim 33, wherein the backup memory block and the primary memory block each have the same fixed offset.

35. The computer-readable storage medium of claim 33, wherein an address of the primary memory block may be mapped to an address of the backup memory address.

36. The computer-readable storage medium of claim 35, wherein the address of the primary memory block is at least one of: a physical address location or an address abstraction component.

37. The computer-readable storage medium of claim 33, wherein the primary memory block comprises a discontiguous memory block.

38. The computer-readable storage medium of claim 37, wherein and the backup memory block has the same relative memory location for each contiguous section of the discontiguous memory block.

39. The computer-readable storage medium of claim 33, wherein the deterministic many-to-one mapping function is a hash function.

40. The computer-readable storage medium of claim 33, further comprising: a third computer-executable instruction operable to apply a deterministic many-to-one mapping function to a plurality of primary memory blocks.

41. The computer-readable storage medium of claim 33, wherein the primary memory block is a sector of storage.

42. The computer-readable storage medium of claim 33, wherein the primary memory block is a cluster of sectors of storage.

* * * * *